July 7, 1964 E. LESHNER 3,140,474

MAGNETIC MEMORY DRUM

Filed July 13, 1960

INVENTOR.
ERVIN LESHNER
BY
Charles S. Hall
ATTORNEY

United States Patent Office 3,140,474
Patented July 7, 1964

3,140,474

MAGNETIC MEMORY DRUM

Ervin Leshner, Philadelphia, Pa., assignor to Burroughs Corporation, Detroit, Mich., a corporation of Michigan Filed July 13, 1960, Ser. No. 42,576
5 Claims. (Cl. 340—174.1)

This invention relates to improvements in high speed information storage apparatus and, more particularly, to an improved memory drum for electronic computers.

In the computer art the use of rotating drumlike storage devices is very extensive. As the use of computers in aircraft, rockets and missiles has increased and the need for much more complex apparatus has grown, the requirement for more compact, efficient and accurate components has become imperative.

The density of information which may be recorded on and reproduced from the recording surface of a memory drum is an inverse function of the air gap or space between the recording and/or reproducing heads and the coating of data storing material; that is to say, the more closely the transducer heads may be brought to the recording surface, the more densely the information may be packed. This relationship is due to the well-known fact that the quality or sharpness of the reaction to any given pulse increases as the distance between the transducer and the affected element is decreased. On the other hand the heads must not ride against the recording surface. There is very rapid relative movement between the heads and the recording surface of a memory drum of a computer and any friction between them might result in damage to the equipment and incorrect computation.

The recording and/or reproducing heads, which fall under the generic term of transducers, are generally referred to in the art as read-write heads and will be usually so termed hereafter. The maintenance of proper spacing of the so called air gap has in the past been a problem of such difficulty that, for a reasonable margin of safety, a gap of .001 to .002 inch usually had to be maintained. This is particularly true in an enclosed memory drum where a protective shell is also an integral part of the device. Important factors contributing to this problem have been irregularities in conventional bearing surfaces and assemblies, and changes in spacing due to uneven heating of the drum components at the beginning of a period of use before stable operating conditions are attained. These factors become of relatively greater importance as the size of the component is reduced.

The minor surface irregularities of conventional bearings not only prevent the drums from running true, but place an additional load on the motor in overcoming the friction of the bearings. The reduction of this load contributes to smaller motor size, which is obviously important in the miniaturization of memory drums.

The solution of the problem of bearing irregularities and friction by the use of air (or fluid) bearings with the conventional cylindrically shaped rotating drum has not significantly reduced the width of the air gap in enclosed memory drums due to the previously necessary allowance for heat expansion. There has heretofore been no means of controlling the width of the air gap, whereby the spacing could be precisely adjusted after working temperatures have developed.

In most enclosed memory drums in the past a cylinder is rotated inside a shell, the outer curved surface of the cylinder having a coating of data storing material and the shell containing the read-write heads. This arrangement necessitated a relatively thick shell to support the heads which added to the size and weight of the unit.

Accordingly one of the important objects of my invention is to achieve precisely adjustable spacing between the read-write heads and the information storing surface of a memory drum.

Another of the important objects of my invention is to adjust the air gap of a memory drum utilizing a horizontal axis of rotation and fluid bearing with full protection against damage in case of lower than normal operating speeds or failure of fluid pressure.

Another of the important objects of my invention is to reduce significantly the size and weight of enclosed memory drum components for electronic computers.

In carrying out the objects of my invention I have devised a memory drum in which coaxial stationary and rotating members are correspondingly slightly frusto-conical in configuration with lateral movement between them, whereby read-write heads in the curved surface of one member may be precisely brought as closely as desired to a layer of data storing material on a juxtaposed curved surface of the other member. The rotating member turns on an air or fluid bearing when the drum is in operation. This bearing is between the curved surface containing the read-write heads and the juxtaposed surface having the data-storing layer. The differences in pressure of the inlet and outlet for air (or liquid) for the bearings are used to control the relative lateral positioning of the members.

In the preferred embodiment of my invention, an inner member of slightly frusto-conical configuration is stationary, with one or more read-write heads in the curved portion thereof, and has axial extensions with sleeve bearing surfaces. A correspondingly frusto-conical outer shell, having a coating of magnetizable material on its inner curved surface, rotates at starting speeds on the sleeve bearings and at normal speeds on the air bearing, the shell being laterally shiftable relative to the stationary member under control of the differential pressures of the inlet and outlet of the air bearing to give an adjustable air gap between the read-write heads and the coating of magnetizable material.

The air under controlled pressure, enters a variable space between the larger ends of the frusto-conical shell and the similarly shaped inner member. Since the shell is laterally shiftable, the air pressure tends to separate these ends, thereby drawing the tapered surfaces of the frusto-conical stationary member and rotating shell closer together. The air flows between the tapered surfaces, forming an air bearing on these surfaces, through a variable space between the smaller ends of the shell and the stationary member and out, under pressure control, through a channel in an axial extension on the stationary member.

The minimum gap between the heads and recording surface in the preferred embodiment may be precisely reduced from a spacing of 0.001–0.002 inch in enclosed memory drums in the prior art to as narrow a gap as desired. With such reduction in this spacing the density of packing of information in the magnetizable surface may be increased from approximately 150 bits per inch to 225–250 bits per inch. This increase in density of information makes possible a significant reduction in the amount of magnetizable surface required for a given amount of information.

In addition, the placement of the read-write heads with attendant circuitry in a stationary inner member, in the preferred embodiment, makes possible a minimum thickness of the outer shell without necessarily increasing the diameter of the inner member.

I prefer a flat or pancake type motor which is unitary with the drum, for rotating the shell.

An important feature of my invention is the use of fluid or air bearings in conjunction with the frusto-conical configuration of the drum. The relative positions of the stationary member and the shell are very accurately regulated by the difference in pressures between the inlet and outlet sides of the air bearing. These controls can be set to maintain the desired air gap or spacing after normal working temperatures have developed. When the rotating member attains working speed it is no longer subject to possible irregularities in normal mechanical bearings, and the heads may be brought more closely to the recording surface without danger of rubbing due to bearing vibration.

The mechanical sleeve-bearing relationship between the inner and outer drums for rotation at less than normal operating speed, and for supporting the rotatable drum when at rest, not only protects the drum in case of failure of air pressure, but makes it possible for a magnetic memory drum to rotate about a horizontal axis on fluid bearing without danger of damage to the transducer means or the recording surface.

Various other objects, advantages and meritorious features of the invention will become more apparent from the following specification, appended claims and accompanying drawings wherein:

Figure 1:
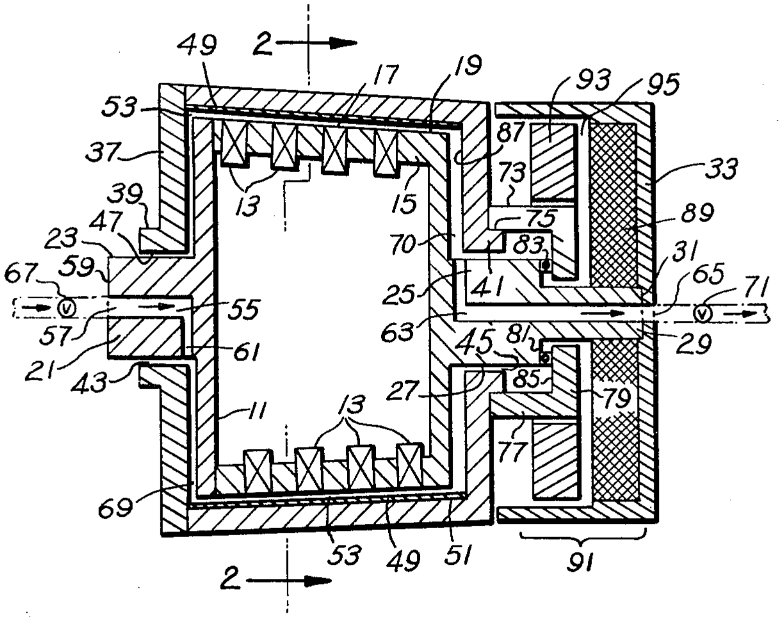
FIGURE 1 is a cross-sectional view of the drum assembly, while rotating at normal speed.

Referring now more particularly to FIGURE 1, a stationary member 11, hereafter referred to as a stator, fabricated of non-magnetic material, has the configuration of a slightly frusto-conical drum. Read-write heads 13 are affixed by any convenient means in the curved wall 15 of the stator 11 with their faces 17 flush with the curved outer surface 19 of the wall 15.

The stator 11 is provided at its larger end with a cylindrical coaxial boss 21, having a smooth outer curved surface 23 suitable for receiving a mechanical bearing such as a sleeve bearing. The stator 11 also has a coaxial shaft 25 opposite the boss 21, having a bearing surface 27 of substantially the same diameter as boss 21 and a portion 29 of reduced diameter, which is fixedly attached at its outer end 31 to housing 33.

Surrounding the stator 11 is a drum-like shell 37 of frusto-conical configuration corresponding to the configuration of the stator 11, having collars 39 and 41 extending outwardly along the bearing surfaces 23 and 27, respectively, to form sleeve bearings 43 and 45. The dimensions of shell 37 are such as to provide room for it to slide laterally on bearings 43, 45 as will be discussed further hereinafter.

Figure 3:
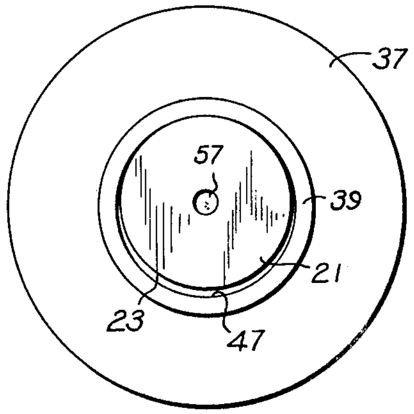
FIGURE 3 is an end view while the shell is rotating at starting speed or at rest.

As shown more particularly in FIGURE 3, there is a loose, or so-called "sloppy," fit between the bearing surfaces 23, 27 and the collars 39, 41, respectively. If the diameter of the boss 21 were 0.75 inch, for example, the diameter of the inner surface 47 of the collar 39 could be approximately 0.006 inch greater. When the shell 37 is at rest or at starting speeds, the collars 39, 41 will, therefore, ride on the tops only of the boss 21 and shaft 25, respectively. This relationship is exaggerated somewhat for clarity in FIGURE 3. It is evident, however, that when the exterior drum is rotating on the mechanical bearings, or is at rest, the axis of rotation of the drum will be in a different position from that when the drum is rotating on the fluid bearings.

Figure 2:
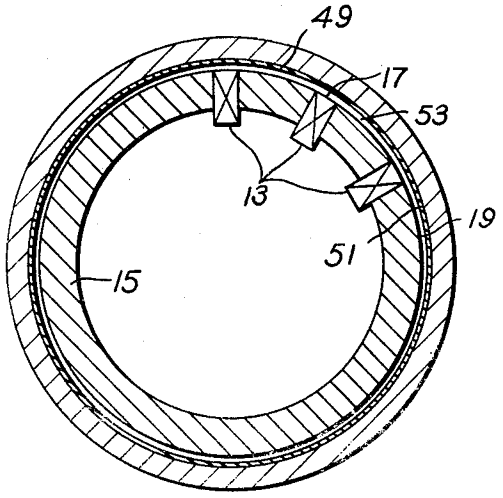
FIGURE 2 is a transverse sectional view, taken on the line 2—2 of FIGURE 1.

The shell 37 is fabricated of non-magnetic material and provided with a coating 49 of magnetizable material on its inner curved surface 51. It is apparent that the faces 17 of the read-write heads 13 in the curved surface 19 of the stator 11 will be juxtaposed to the magnetizable coating 49, separated only by a spacing or "air gap" 53, as shown also in FIGURE 2.

It will also be apparent from the frusto-conical configuration of the stator 11 and the shell 37 that when the larger ends of these members are closest together the tapered surfaces 19 and 51 will be farthest apart and that when the smaller ends of these members are brought closer together the tapered surfaces 19 and 51 will approach each other.

The boss 21 is provided with a channel 55 having an inlet 57 at its outer surface 59 and an outlet 61 in its curved surface 23 proximate the body of the stator 11. Similarly the shaft 25 has a channel 63 running from the bearing surface 27 proximate the body of the stator 11 outwardly therefrom. The channel 63 continues through the housing 33 to an outlet 65.

The channel 55 provides an inlet for air or fluid under pressure from any convenient means (not shown) under regulation of any suitable control means, such as a valve 67. The air or fluid flows into a variable space 69 between the stator 11 and the shell 37, through the air gap 53 and out through a space 70, variable conversely to the space 69, and the channel 63 under regulation of any suitable outlet control means, such as a valve 71.

The theory and action of air (or fluid) bearings is well known and need not be described in detail here. It is sufficient to say that the shell 37 will rotate coaxially with the stator 11 on a film of air or fluid, as may be used, between the juxtaposed curved surfaces of the stator 11 and the magnetic coating 49. Air under pressure reacts like a liquid, as is well known, and is referred to as a liquid in this art. Other liquids, such as oils, are often used for such bearings and may be used in my invention. However, air is preferable for small drums and I shall usually refer to this relationship, hereafter, as an air bearing.

The rotating shell 37 will orient itself on the air bearing and become absolutely coaxial with the stator 11. The collars 39 and 41 will, therefore, rotate around the boss 21 and shaft 25, respectively, independently of the sleeve bearings 43 and 45.

The frusto-conical configurations of the stator 11 and shell 37 have the additional advantage of overcoming the tendency to "whip" which sometimes occurs in air bearings.

The boss 21 is on the larger end of the stator 11, as previously stated. When air under pressure comes through the channel 55 into the space 69 between the stator 11 and the shell 37 it tends to force these two bodies apart. Since the shell 37 is slidable laterally on the boss 21 and shaft 25, the shell 37 moves laterally bringing the juxtaposed tapered surfaces 19 and 51 more closely together. The air gap 53 is reduced and the faces 17 of the heads 13 are brought more closely to the surface of the magnetizable coating 49.

The amount of taper of the frusto-conical configurations of the stator 11 and shell 37 is a problem of geometry only, depending on the size of the drum, the amount of axial motion and the slope of the sleeve bearings. In any event only a slight taper is required to achieve the stated relationship between the stator 11 and the shell 37. Such a taper ordinarily ranges between 2% and 5% in terms of the increase in radius and length of the drum.

The excess of the radial dimensions of the shell 37 over the stator 11 is a function of the coefficients of expansion of the materials from which these components are fabricated. The maximum distance between the outer curved surface 19 of the stator 11 and the coated inner surface 51 of the shell 37 will occur when space 69 is a minimum. In this situation the spacing should be only sufficient to allow for changes in the spacing due to heat expansion and for precise control of the working air gap. These are considerations well within the scope of anyone skilled in the art.

By adjustment of the differential air pressures at the inlet 57 and the outlet 65 under control of the valves 67 and 71, respectively, the relative positions of the stator 11 and the shell 37, rotating about it on a dynamic air bearing, may be determined as precisely as desired. The specific differential pressures will vary with the size of the drum, the amount of taper, the speed of the rotating member, and the width of the air gap desired. The determination of the pressures in any given set of circumstances is well within the scope of any craftsman skilled in the art.

In the preferred embodiment I have attached a temperature limitation stop member 73 to the outer curved surface 75 of the collar 41 abutting the shell 37. The stop member 73 is composed of a cylindrical portion 77 extending outwardly from the shell 37 and an inturned portion 79. The inturned portion 79 extends into an area between a shoulder 81 on the shaft 25 and the reduced portion 29 of the shaft 25. A bearing 83 may be attached to the shoulder 81. The abutment of the inner surface 85 of the stop member 77 against the bearing 83, together with the expansion of the stop member 77 itself, determines the maximum lateral movement of the shell 37 under the force of compressed air entering the area 69. If desired, the bearing 83 may be on the inner surface 85 of the stop member 73.

The expansion of the temperature limitation stop member 73 at working temperatures will be determined by its size, configuration and the coefficient of expansion of the material of which it is fabricated. The substance to be used for the stop member 73 can be selected from an engineering handbook, according to the effect desired and the size of the member, by any person skilled in the art.

If extremely close spacing is not justified, the stop member 73 may be eliminated. In such a case a simple stop member might be placed on the inner wall 87 of the smaller end of the shell 37 to determine its maximum lateral movement.

A stationary field winding 89 of a flat or pancake type motor 91 is fixedly attached to the reduced portion 29 of the shaft 25 proximate the housing 33. A rotor magnet structure 93 for the motor 91 is affixed to the outer surface of the cylindrical portion 77 of the stop member 73. In this arrangement the motor magnet structure 93 is parallel to the stationary field winding 89 and separated from it by the air space 95. The magnet structure 93 may be a permanent magnet or an electromagnet, as is well known. I prefer to use a permanent magnet in the embodiment of my invention in small drums.

The field produced by the winding 89 interlocks with the field of the rotor magnet structure 93 to rotate the shell 37 to which the rotor magnet structure 93 is fixed, as is well known in synchronous motors.

If the temperature limitation stop 73 is not required, the collar 41 can be extended somewhat and the rotor magnet structure 93 affixed directly to it.

Although I prefer a stationary inner member containing read-write heads and a rotating shell with an inner layer of magnetizable material, frusto-conical configurations with relative lateral movement of the surface containing the heads and the surface with the magnetic coating can be obtained with the heads in a stationary outer shell and the magnetic surface coating on a rotating inner drum.

Likewise the frusto-conical configurations of nested interior and exterior members can operate on sleeve bearings without an air or fluid bearing, if a minimum air gap is not required, and still be within the scope of my invention. The relative lateral position of the members could be controlled by differential air or fluid pressures as described heretofore.

Although I have used a magnetizable coating in the preferred embodiment of my memory drum, my invention lends itself just as well to memory drums having recording surfaces designed for static charge storage, or other types of storage suitable for memory drums. Of course, the transducer heads and circuitry would vary in type to agree with the recording surface employed.

Although I have included an outlet channel 63 in my preferred embodiment, air will leak out through the sleeve bearing 45. The channel 63 may, therefore, be eliminated, if desired, with a controlled inlet pressure differential against a constant leakage. In any case, the inlet pressure could be maintained and controlled by a variable pressure pump, or other means well known in the art.

I therefore claim:

1. In electronic data processing apparatus, a high speed, high density, data storage device comprising a slightly tapered, frusto-conical stator member having on the larger end thereof a first coaxial hub with an exterior sleeve bearing surface and having on the lesser end thereof a second coaxial hub with a sleeve bearing surface portion and a shaft portion, a plurality of spaced transducer heads mounted in the curved portion of said stator member, a frusto-conical rotor member, tapered correspondingly to said stator member and having a loose fit, mechanical, sleeve bearing relationship therewith, a recording surface on said rotor member juxtaposed to said transducer heads, a space between said rotor member and said stator member, said members having relative lateral movement therebetween, a variable air gap between said heads and said recording surface, a synchronous motor field winding attached to said shaft portion, an extension on said rotor member, a synchronous motor magnet structure attached to said extension, a housing around said field winding and said magnet structure fixed to said field winding, an inlet channel through said first coaxial hub to said space, an outlet from said space in the vicinity of said second coaxial hub and an air bearing relationship between the curved surface of said stator and said recording surface, whereby the width of said air gap can be varied through said lateral movement under controlled air pressure through said inlet channel to said air bearing, and whereby said rotor member rotates on said sleeve bearings at starting speeds and on said air bearing at normal speeds.

2. An apparatus as set forth in claim 1 in which the extension on said rotor member is a temperature limitation stop member cooperating with an end of said sleeve bearing portion of said second coaxial hub.

3. A magnetic memory drum comprising, in combination, a closed stationary member of slightly frusto-conical configuration having a plurality of magnetic heads mounted in the curved portion thereof, a rotatable member of frusto-conical configuration corresponding to said stationary member and substantially coaxial therewith, having a layer of magnetizable material on a curved surface thereof opposite said magnetic heads and having also a normal starting position and a normal operating position laterally spaced therefrom, sleeve bearings supporting said rotating member in said starting position and a fluid bearing between said curved surfaces supporting said rotating member in said normal operating position.

4. A magnetic memory device comprising, in combination, a slightly frusto-conical interior stationary drum of non-magnetic material having magnetic heads mounted in the curved portion thereof and having hub extensions with mechanical bearing surfaces thereon, a rotatable exterior drum of configuration corresponding to said stationary drum and separated therefrom by a narrow space, having a mechanical bearing relationship to said hub extensions and a fluid-bearing relationship to said curved portion of said stationary drum and limited lateral movement on said bearing surfaces, a recording surface on the inside of said exterior drum opposite said magnetic heads, an inlet to said space between the larger ends of said drums and an outlet from said space between the smaller ends of said drums, means to apply fluid, under controlled pressure to said inlet and a pressure control at said outlet, whereby the relative lateral positions of the drums are precisely determined by the differential inlet and outlet pressures during the operation of said device.

5. A magnetic memory drum comprising an interior member of slightly frusto-conical configuration, an exterior member of conjugate configuration, at least one transducer head in a curved surface of one of said members, a coating of recording material on a juxtaposed surface of the other of said members, said members having rotative and lateral movement therebetween and having a first bearing relationship for normal starting and a second bearing relationship for normal operation said first bearing relationship including, loose-fit, sleeve bearings on the outer ends of said members, for rotation on a horizontal axis, and said second bearing relationship including an air bearing between said members.

References Cited in the file of this patent

UNITED STATES PATENTS

| | | |
|---|---|---|
| 2,915,358 | Richards | Dec. 1, 1959 |
| 2,929,671 | Taylor | Mar. 22, 1960 |
| 3,029,416 | Quade | Apr. 10, 1962 |
| 3,063,039 | Taft | Nov. 6, 1962 |